Figure 1:
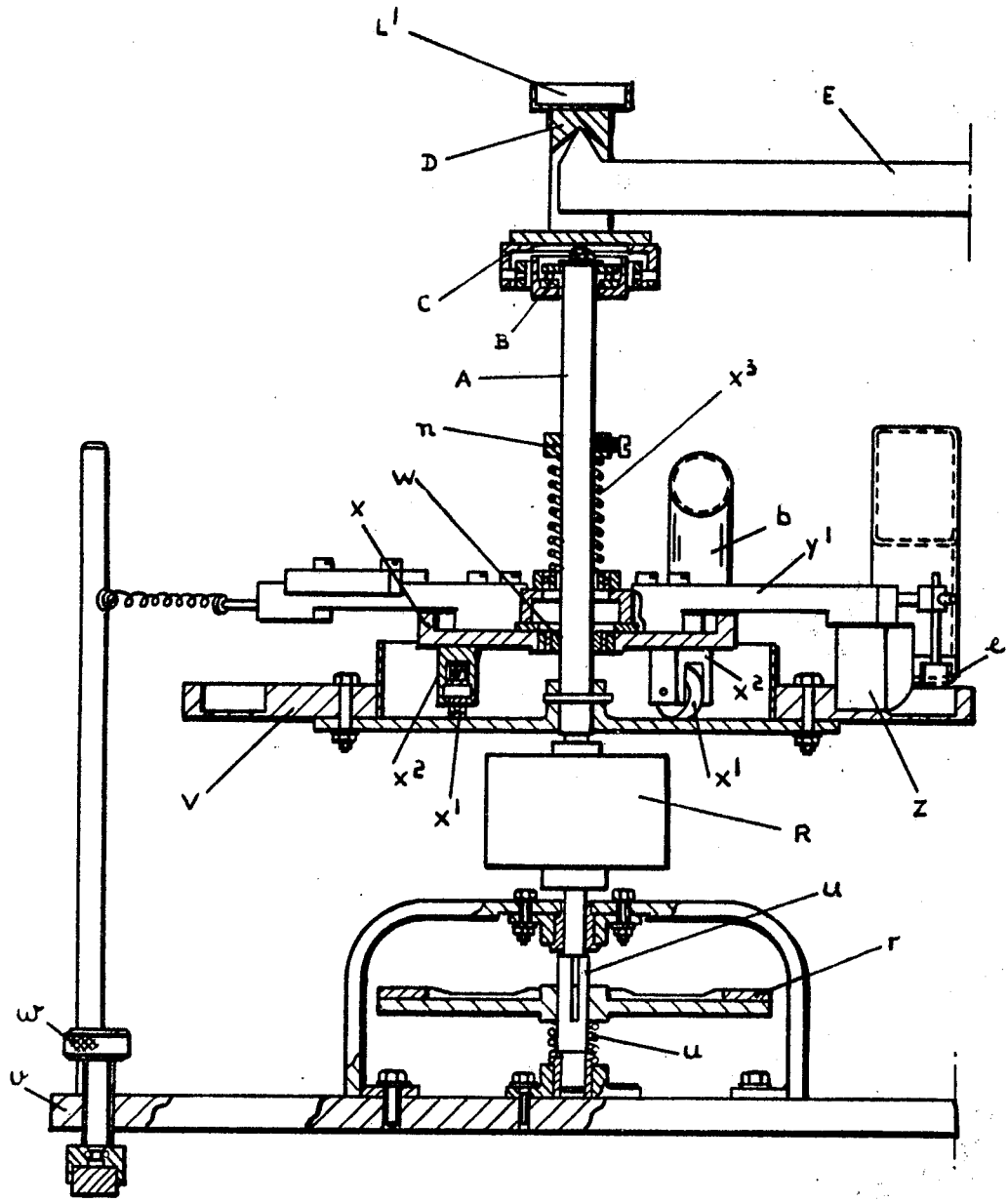

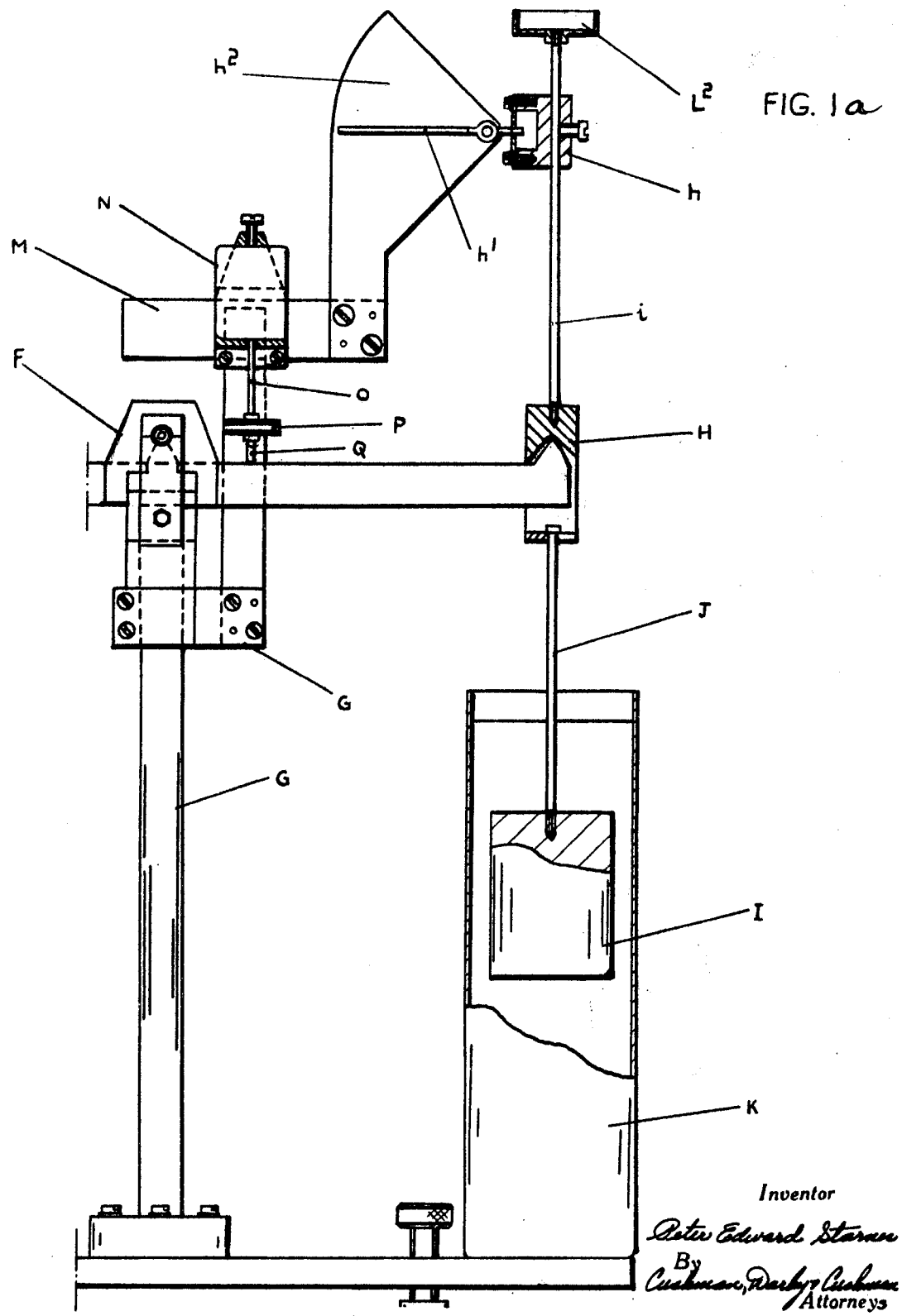

United States Patent Office 3,445,651
Patented May 20, 1969

3,445,651
RADIOMETRIC ANALYSIS OF POWDERED
SAMPLE MATERIAL
Peter Edward Starnes, Earley, Reading, England, assignor to Hilger & Watts Limited, London, England, a British company
Filed July 6, 1964, Ser. No. 380,254
Int. Cl. H01j 37/00; G01n 23/12
U.S. Cl. 250—43.5        17 Claims This invention is concerned with an improved method and apparatus for the determination of the chemical composition of materials by means of radiometric analysis; that is to say by causing a sample of the material which is to be analysed to interact with an incident beam of radiation of known characteristics, and detecting and measuring the characteristics of resultant radiation or radiations emanating from the sample.

The sample is required to be in the form of a dry powder and may be prepared in this way by a number of suitable known means.

The incident beam of radiation may be in the form of electromagnetic radiation such as X-rays, or corpuscular radiation such as electrons or neutrons, or a mixture of both types of radiation. The resultant radiation emanating from the sample may similarly consist of either or both types of radiation, that is to say, electromagnetic or corpuscular, and it will generally result from transmission of the incident beam through the sample, back-scattering of the incident beam by the sample material, the production of characteristic secondary radiation by the excitation of specific atoms of the sample material, or a combination of some or all of these effects.

Such effects are well known in the art and have previously been employed to make accurate quantitative deductions concerning the chemical composition of specially prepared individual samples of compacted material. A main object of the present invention is to provide for the continuous sampling and accurate testing of dry powder material by means of radiometric analysis without the necessity for forming discrete compacted samples.

In this respect, it has been found that certain essential geometrical criteria must be met to ensure accuracy as follows:

(A) *In relation to the measurement of radiation transmitted through the sample*

(1) The relative dispositions of the source of instant radiation and the sample, and the sample and the resultant radiation detecting device should remain substantially constant during the test.

(2) The mass per unit area of the sample material traversed by the radiation should remain substantially constant during the test at a value appropriate to the nature of the sample and the type of instant radiation. This value will generally be of the order of 100 to 10,000 milligrams per sq. cm., although it may sometimes lie outside this range.

(3) The surface of a powder sample should be smooth and free from defects.

(4) Any material which serves to support or contain the powder sample during the test, and through which either or both the incident and resultant radiations must pass, should be chosen so as to cause the smallest practical absorption of said radiation during its passage through it. In practice this means that the material should be in the form of a very thin "window" composed of an element or elements of low atomic number such as beryllium or aluminium, or of a rigid organic material consisting essentially of carbon and hydrogen in chemical combination.

(B) *In relation to the measurement of radiation resulting from random back-scattering and/or specific emission (e.g., X-ray fluorescence) originating in the sample material*

(1) The relative dispositions of the powder sample, the source of incident radiation and the resultant radiation detecting device (which in this case are not separated by the sample) should remain substantially constant during the test.

(2) The depth of the sample at the point of incidence of the incident radiation must not be less than the "saturation thickness" for the interaction involved. The saturation thickness will not normally exceed 10 cm.

(3) The bulk density of the sample material involved in the interaction must remain substantially constant during the test.

(4) The surface of the sample layer should be smooth and free from defects.

(5) Any material which serves to support or contain the powder sample during the test, through which either or both the incident and resultant radiations must pass, should be chosen so as to cause the smallest practicable absorption of said radiation during the passage through it. In practice this means that the material should be in the form of a very thin "window" composed of an element or elements of low atomic number such as beryllium or aluminium, or of a rigid organic material consisting essentially of carbon and hydrogen in chemical combination.

Accordingly, the present invention provides a method of carrying out radiometric analysis of powdered sample material including the steps of feeding said powdered material continuously on to a moving sample carrier, continuously weighing said material on the carrier, controlling the feed rate as a function of said weight to form on the carrier a layer or ribbon having a known and substantially constant mass per unit area and substantially constant depth, applying to said layer or ribbon a known incident radiation under precisely defined geometric conditions and detecting and measuring the resultant radiations emanating from the sample.

According to a further aspect of the invention, there is provided apparatus for carrying out the foregoing method including a movable sample carrier, means for forming a layer or ribbon of sample material on said carrier of continuously measured and substantially constant mass per unit area and substantially constant thickness and width, a source of radiation past which said sample layer can be moved by the carrier at a substantially constant distance from said source so as to be irradiated and means for measuring the resultant radiations emanating from the sample.

If the apparatus is such that the radiation is transmitted through a part of the sample carrier, then such carrier part is conveniently manufactured from a suitable material such as thin beryllium, aluminium sheet or foil or a rigid plastic material.

Figure 2:
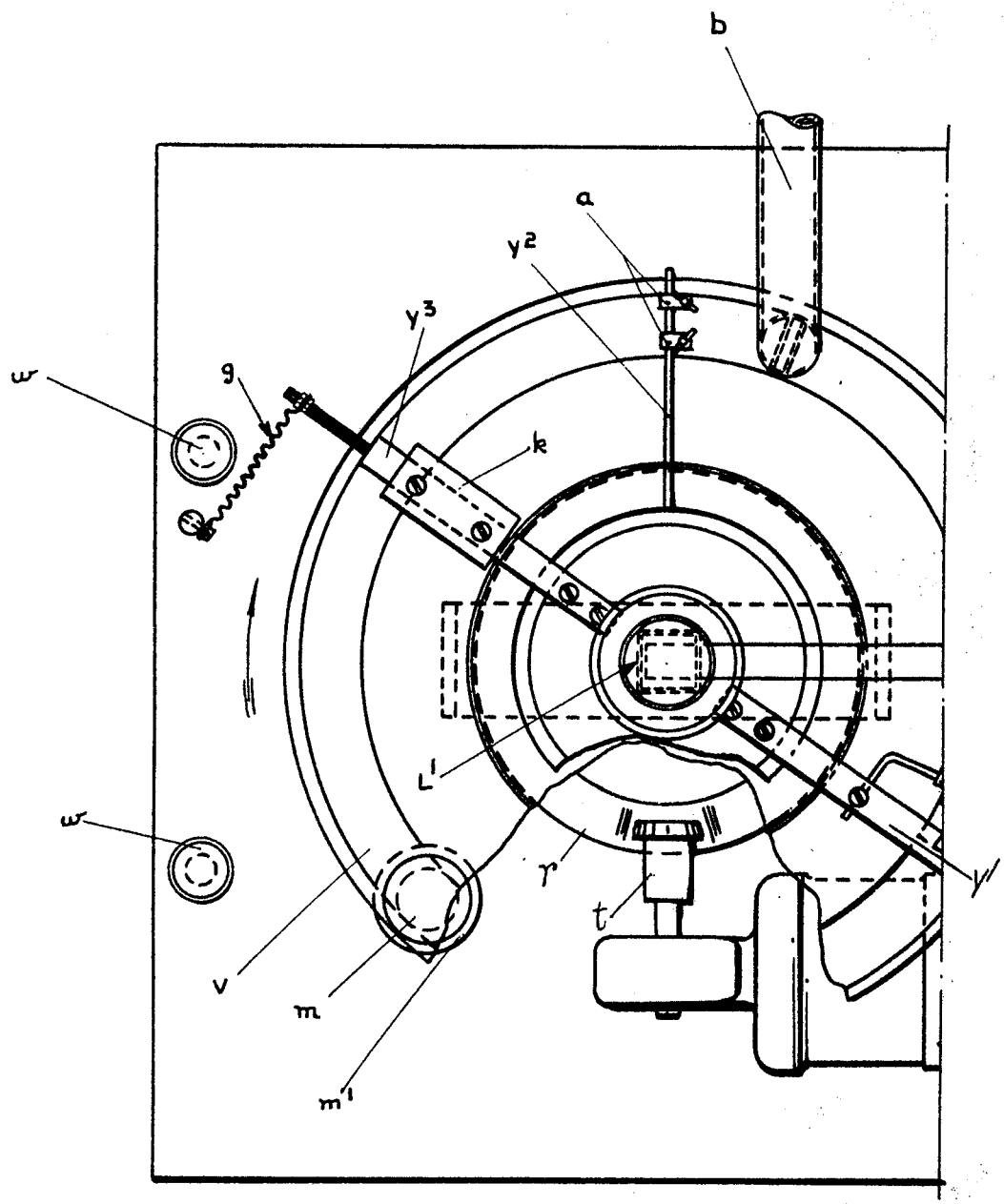
Figure 2A:
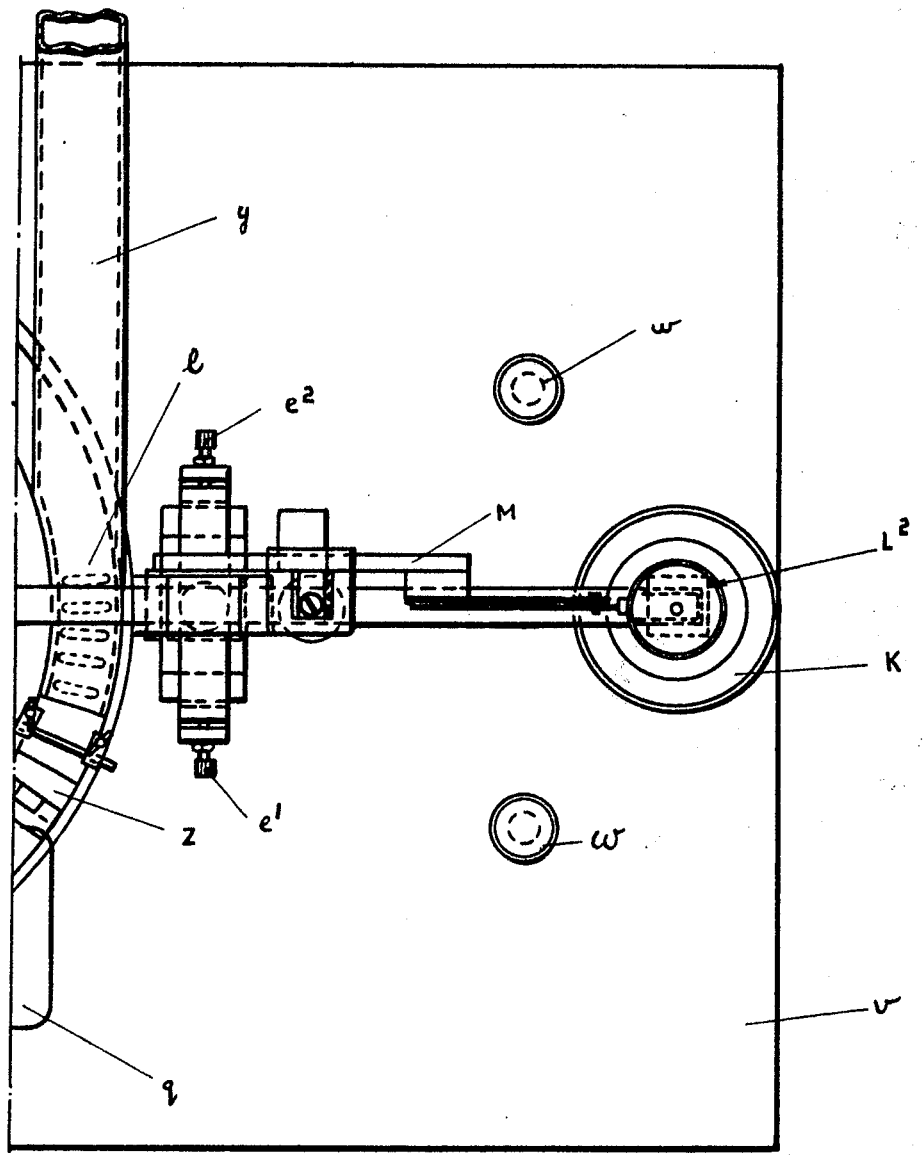
Figure 3:
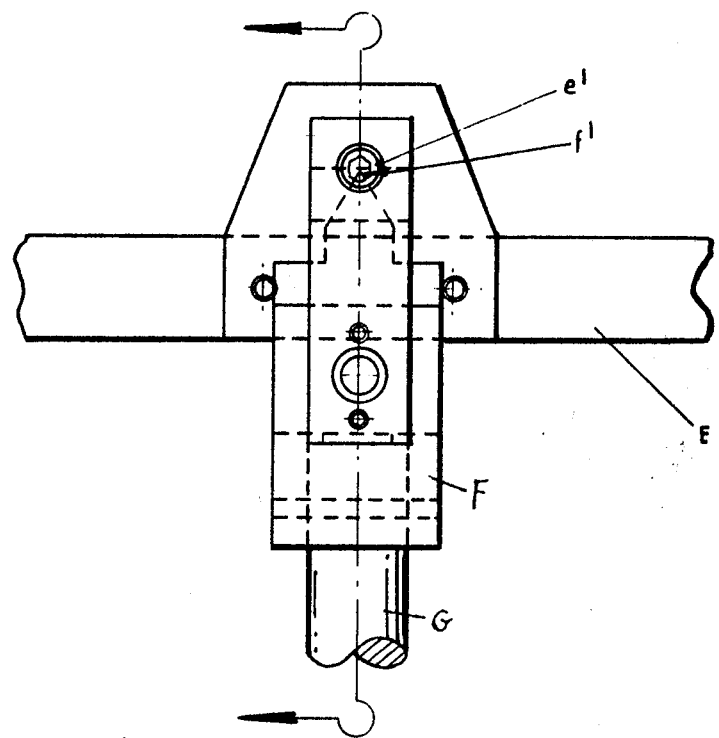
Figure 4:
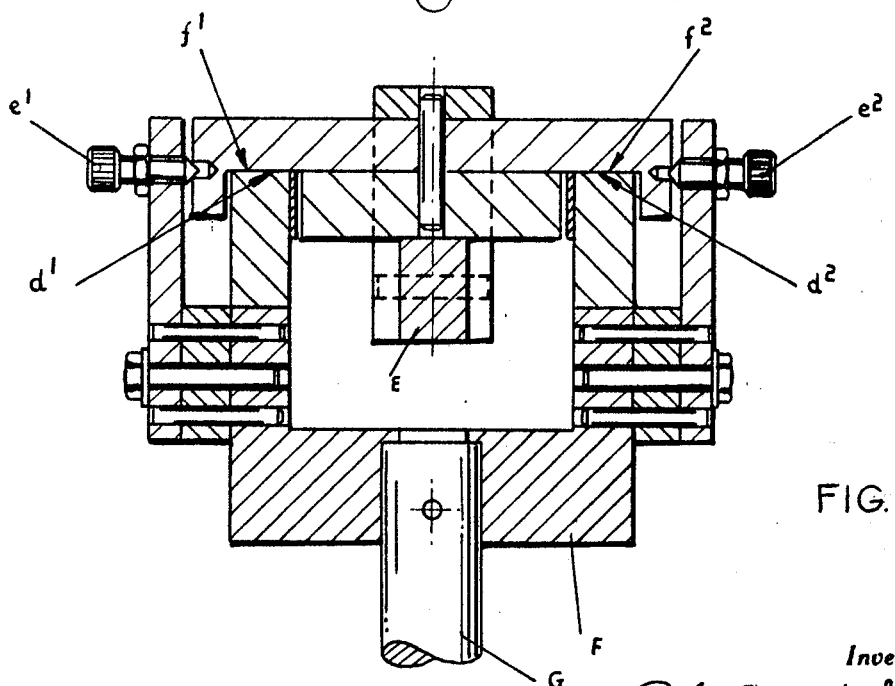
Figure 5:
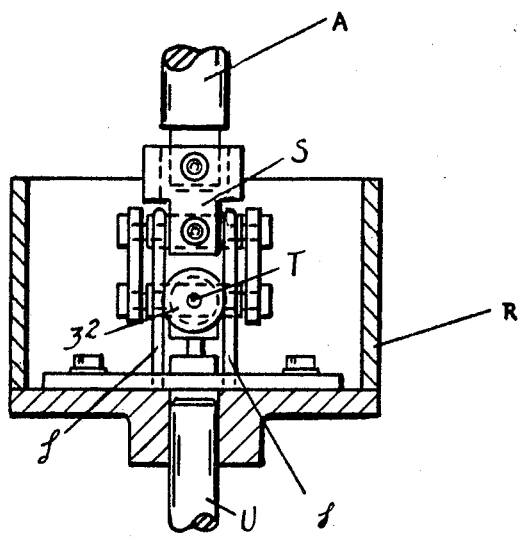
Figure 6:
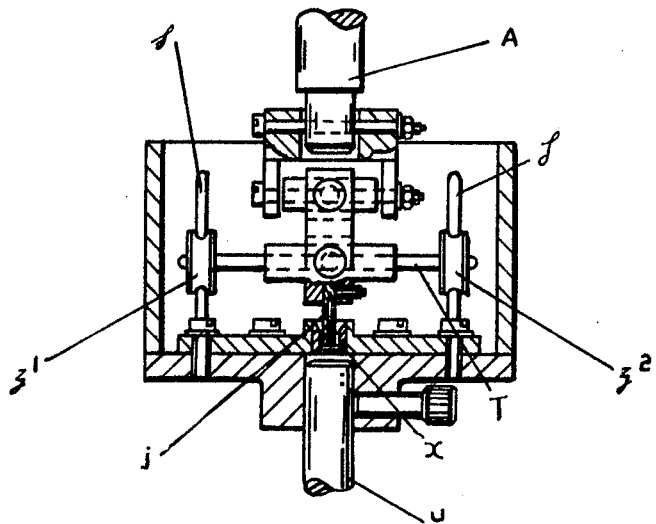

In order that the invention may be clearly understood and readily carried into effect, one embodiment thereof will now be described in detail with reference to the accompanying drawings, in which:

FIGURES 1 and 1a are in part-sectional and partially diagrammatic elevation showings of the major part of one form of apparatus suitable for use in carrying out the invention, FIGURES 2 and 2a are plan views, partially broken away, of the apparatus shown in FIGURES 1 and 1a, FIGURE 3 is a detail view in elevation and to a larger scale of part of the apparatus shown in FIGURES 1a and 2a, FIGURE 4 is a sectional elevation of the detail shown in FIGURE 3 and taken at right angles thereto, FIGURE 5 is a sectional elevation of a further detail of the apparatus shown in FIGURES 1 and 2 again to a larger scale, and FIGURE 6 is a view similar to FIGURE 5 but taken at right angles thereto.

Referring now to the drawings, the illustrated apparatus is especially suited to the continuous measurement of radiation transmitted through sample material presented at substantially constant mass per unit area. To this end the apparatus incorporates a vertical shaft A which may be some 7 inches long, for example, and is depended from the top element of a thrust race B. The lower element of the thrust race is supported in a universal gimbal mounting C which is in turn depended, by means of a saddle assembly D, from a knife-edge at one end of a balance beam E. The aforesaid balance beam is supported above its centre of gravity by a double knife-edge assembly F, which is fixed to a rigid support frame G. Said rigid support frame is fixed to a base plate $v$, provided with four adjustable feet $w$ fitted with shock absorbing rubber pads.

The double knife-edge assembly F is designed so as to permit free movement of the balance beam E about a horizontal axis coinciding with the line of contact of two knife edges $f1$ and $f2$ with bearing surfaces $d1$ and $d2$; the assembly is, however, provided with adjustable conical-ended lateral locating pins $e1$ and $e2$ which serve to prevent the balance beam from yawing about a vertical axis, but without sensibly restraining movement of said balance beam about its fulcrum.

The end of the balance beam E distant from the vertical shaft A, is fitted with a knife-edge which supports a saddle assembly H, which carries a counterweight I at the end of a slender support rod J. This counterweight is contained by a cylindrical container or pot K. During operation of the apparatus, the pot K is filled with oil so as completely to immerse the counterweight. The clearance between the counterweight and the sides of the pot is sufficient to ensure that no "piston effect" obtains. This arrangement constitutes a damping system designed to suppress unwanted oscillations of the balance beam E during operation of the apparatus.

Scale pans L1 and L2 are supported by the tops of the saddle assemblies D and H, the scale pan L2 being carried by the extended slender support rod $i$.

Above the balance beam E and fixed to the rigid support frame G is an adjustable mounting M carrying the sensitive load cell or dynamometer N. A clamp assembly $h$ carrying a pointer $h1$ is fixed to the support rod $i$ so as to provide an indication against a suitable scale $h2$ of the position of the balance beam E in relation to the horizontal.

A probe O, which is fixed to the sensing element of the dynamometer N, is joined to a contact unit P. This contact unit is composed of two rigid horizontal circular plates about 1½ inches in diameter separated by a pad of flexible material such as rubber some ¼ of an inch thick. The bottom rigid plate carries a contact stud Q which terminates in a hemispherical head having a diameter of about ⅛ of an inch. Said contact stud cooperates with the top of the balance beam E. The contact unit serves to damp high frequency oscillations of the balance beam and to prevent these from being transmitted to the sensing element of the dynamometer.

The dynamometer mounting M is arranged to permit horizontal adjustment of the dynamometer and contact unit so that the contact stud Q can be made to cooperate with the top of the balance beam E at a number of positions along the beam in a predetermined range. The dynamometer may be located in the selected position on its mounting by means of a set screw (not shown). The dynamometer mounting also provides means for vertical adjustment so as to ensure that the contact stud Q cooperates correctly with the balance beam E when the latter is in a horizontal or near-horizontal position.

It will be understood that the ability to alter the position of contact between the contact stud Q and the top of the balance beam E as described above provides a mechanical means of adjusting the sensitivity of the weighing system constituted by the balance beam and dynamometer assembly. This arises from the fact that the upward force exerted upon the dynamometer due to a positive out-of-balance force acting downwards through the saddle assembly D will be equal to $L/l \times f$ in magnitude where L is the distance between the knife-edge supporting the saddle and the balance beam fulcrum represented by the knife-edge assembly F and $l$ is the distance between the fulcrum and the point of contact of the contact stud Q and the balance beam E. Thus by arranging to make $l$ a small fraction of L, the force applied to the dynamometer can be caused to be several times greater than the out-of-balance force at D of which it is a measure, with a consequent improvement in the performance of the apparatus.

The electrical signal derived from the dynamometer N is proportional to the upwards force transmitted to the sensing element of the latter via the contact unit P and the probe O. This signal is amplified by conventional means and used to drive a suitable instrument so as to provide an indication and/or record of any out-of-balance force acting downwards on the balance beam E through the saddle D and its supporting knife-edge.

Since the amplification factor can be varied, this provides a second means of adjusting the sensitivity of the apparatus. The amplified signal from the dynamometer is also used to control the operation of the apparatus in a manner described later in the specification.

It should be noted that the dynamometer N is designed so that the vertical movement of the probe O does not exceed some 0.001 to 0.002 inch as between the minimum and maximum loading conditions experienced during the operation of the apparatus. The position of the balance beam E thus remains sensibly constant and horizontal during normal working.

The bottom of the vertical shaft A is in connection with a universal coupling S. This universal coupling carries upon its bottom element a horizontal pin T upon which are fitted two small grooved wheels $z1$ and $z2$ made of a material having a very low coefficient of friction such as polytetrafluoroethylene. The grooved wheels engage with four vertical polished driving pins $s$, two only of which can be seen in FIGURE 6, which are mounted in the base of a cylindrical container R carried by a vertical drive shaft U.

An open-ended hollow polished steel needle $j$ is fixed so as to depend vertically from the centre of the bottom elements of the coupling S and this cooperates with a lined bush $x$ fixed centrally to the bottom of the container R. The lining of said bush is composed of low friction material. A hole drilled into the side of the needle $j$ near its top communicates with the central cavity within said needle and serves to prevent any "piston effect" from occurring between the needle and the sides of the lined bush which receives it.

The cylinder R is filled with oil during operation and the arrangement described allows a positive rotational drive to be transmitted to the coupling S from the shaft U via the aforesaid driving pins and grooved wheels while, at the same time, allowing for the free vertical movement of the shaft A, within defined limits, with a minimum restraint due to friction. The coupling S can accommodate also a limited precessional movement of the shaft A, within defined limits, if this occurs.

A rubber-faced driving plate $r$ mounted upon the shaft U is driven by an electric motor $q$ through conventional speed reducing means and a bevelled knurled wheel $t$ at a predetermined and substantially constant speed in the range 5 to 25 r.p.m. when the apparatus is in use.

In order further to reduce the friction effect between the driving pins $s$ and the grooved wheels $z1$ and $z2$, it has been found advantageous to transmit a regular jolt of small vertical amplitude to the cylindrical container R. The preferred frequency of said jolting action is some four times the rotational frequency of the shaft U. For example, if the shaft U is rotating at a speed of 12 r.p.m. and therefore has a rotational frequency of 5 seconds, the jolting should have a frequency of about 1.25 seconds. Such jolting or low frequency vibration may be provided by a variety of mechanical means. The means selected should preferably allow for simple adjustment of the amplitude of the vibration which will normally be required to be in the order of 0.01 to 0.005 inch.

One such method of providing a jolt of variable amplitude consists of fitting the rubber contact surface of the driving plate $r$ with cam-like projections designed to cooperate with the bevelled wheel $t$ and arranging for the shaft U to have an adjustable end float with respect to its top and bottom bearings. A helical spring $u$ maintains the necessary contact pressure between the face of the driving plate $r$ and the bevel wheel $t$, while permitting the desired small cyclic vertical movements of the shaft U induced by the cams. According to the means used, the provision of the jolting action described may or may not result in momentary fluctuations in the speed of rotation of the shaft A. Providing that these are small and that the overall rotation time remains substantially constant, such fluctuations have no adverse effect upon the performance of the apparatus.

Near the bottom of the shaft A is rigidly fixed a disc V some 12 inches in diameter, the plane of which is perpendicular to the axis of said shaft. The disc is provided with an upwardly opening guide channel in the form of an annular groove near the periphery which is about 1 inch wide and ¼ inch deep. The bottom of the annular groove is formed of a very thin laminar material of low absorption coefficient for the radiation to be used during the operation of the apparatus.

Immediately above the top surface of the horizontal disc, the vertical shaft which supports it is inserted in a sleeve which forms the inner element of a ball race W. The outer element of this ball race registers in a circular recess in a platform X so as to locate the platform with respect to the vertical disc shaft A. The platform X is supported by three rollers $X^1$ two only of which are shown. These rollers are carried by three arms $X^2$, two only of which are shown, fixed to the platform so that the axes of rotation of the rollers are radial to the vertical shaft A and arranged so that the outer surfaces of the rollers bear upon the smooth surface of the horizontal disc V radially inwardly of the annular groove. A spring $X^3$ is provided for lightly spring-loading the platform X down on to the horizontal disc V the pressure being adjustable by means of a collar $n$.

Mounted on the platform X are three radial arms $Y^1$, $Y^2$ and $Y^3$. The first of these $Y^1$, carries an assembly designed to compact the material to be tested into a layer or ribbon of substantially constant depth within the aforesaid annular groove said depth being adjustable within defined limits. The assembly consists of a compactor in the form of a shoe Z with or without additional smoothing rollers.

The second radial arm $Y^2$ carries a plough assembly $a$ arranged so as to loosen the compacted material in the annular groove thereby to facilitate its withdrawal by a suction nozzle $b$ which is connected to a conventional pneumatic extraction system.

The third radial arm $Y^3$ cooperates via a spring $g$ with a member of the rigid support frame G so as to prevent any rotary movement of the platform X during operation of the apparatus, but without imposing any sensible inhibition on the vertical movement of the shaft, disc and platform assembly. A balancing weight $k$ is carried upon the arm $Y^3$ and the position of this weight may be adjusted to help correct for any tendency of the disc V to be displaced from the horizontal plane during operation.

An electric vibrating feeder of known form in communication with a hopper (not shown) and having a feed spout $y$ is arranged so as to receive the material to be tested and to transfer it via a spreading device in the form of a louvred tray $l$ to the annular groove in the horizontal disc. Means are provided whereby the rate of transfer from the vibrating feeder is controlled by reference to the mass of sample material carried on the disc at any one time as indicated by the output from the dynamometer amplifier so as to maintain the said mass carried by the disc substantially constant. The means used to achieve this are not, in general, novel being in the form of a conventional electronic control system; an error signal derived from the dynamometer amplifier output is used as the control signal and the voltage applied to the electromagnetic vibrating feeder is the controlled variable.

One aspect of the control system has, however, been found to be of special importance in this application and specific means have been devised to obtain the desired performance. It has been found that it is essential that the control system should not be sensitive to vibrations in the dynamometer output signal of small amplitude and short duration, since these are commonly due to artifacts resulting from periodic disturbances arising from the rotation of the disc during operation of the apparatus or other causes. At the same time, it is necessary that small deviations which persist for more than a second or so should be corrected adequately.

It has been found that both these requirements can be met satisfactorily by the provision of a control system which incorporates both proportional and integral response circuits. It is particularly convenient if the relative sensitivity of the system to the two terms, that is to say, the proportional and integral terms of the error signal, can be adjusted and also if means are provided to vary the time constant of the integral terms response circuit. The range of variation found to be appropriate is in the order of from $1t$ to $5t$ where $t$ is the time taken for one complete rotation of the shaft and disc assembly.

The disposition of the feeder, compacting assembly, scraper and suction nozzle are such as to ensure that, during operation, some three-quarters of the area of the aforementioned annular groove is occupied by the sample material.

The whole of the apparatus as described above, apart from the rigid support frame and the knife edges, saddle assemblies, bearing surfaces and other parts subject to wear, is preferably constructed of lightweight material such as aluminium alloy or rigid plastic material so that the sensitivity of response to change in weight of the sample material carried by the disc is maximised.

The apparatus as described is primarily intended for use when the material to be tested is required to be in the form of a homogeneously compacted layer having a thickness in the range of 0.50 to 3.0 mm. which is to be irradiated by radiation from a source of radiation or sources of radiation located at a predetermined position or positions such as $m1$ below the rotating disc. Detecting equipment which is designed for the detection and measurement of the radiation transmitted through the sample material, is then located at a predetermined position such as $m$ on the same vertical axis on the other side of the disc. Alternatively, the positions of the source and equipment may be interchanged. The described apparatus may, however, also be used in applications where the source of radiation and the detector are situated on the same side of the disc as when the detected radiation is in the form of back-scattered incident radiation or fluorescent X-rays, or where both transmitted and back-scattered radiation are measured at the same time.

The positions of the sources and detectors are chosen so that the interactions between the incident radiation and the sample material always take place with material that has been properly compacted by the aforementioned compaction assembly. The sources of radiation and detectors are conveniently mounted on a member of the rigid support frame G.

It is preferred that said member of the rigid support frame shall be provided with simple means for accurately adjusting and locating the position of the sources and detectors which it supports.

The radiation detector or detectors are in electrical connection with conventional means for measuring and displaying the characteristics of the radiation detected by said detectors. Such display will normally be in terms of the count rate expressed as the number of photons or particles per second apprehended by each detector singly with or without separation of the photons or particles into groups of defined energy range.

Sometimes, however, it is desired to combine the output from two detectors so that the parameter displayed is a function of two distinct radiometric interactions which by virtue of the method of sample presentation described can be carried out under identical conditions of experimental geometry. Such combination may be effected by known electronic means.

Usually it is desirable that the count rate as registered by the appropriate equipment shall be an average value derived from the number of counts integrated over a finite interval of time. This arises for two reasons. Firstly, in order to avoid inaccuracy due to the normal statistically random short term variations in the rate of emission characteristic of sources of radiation it is necessary to ensure that the number of photons or particles counted is sufficient to give the desired degree of accuracy. Depending upon the type of source used and the statistical accuracy required, this may imply a time constant in the counting equipment varying from a few seconds to several minutes. Secondly, during continuous analyis, it is not generally desirable that the parameter or index displayed shall reflect transient variations in count rate which may be due to minor irregularities in the sample material.

The method of sample presentation achieved by the described apparatus maintains the essential geometric criteria substantially constant during the whole period of operation so that integration of the counting rate may, if necessary be carried out over a long period of time without the introduction of errors due to variations in sample presentation. Such integration may be performed by known electronic means.

The apparatus as described is shielded by suitable materials to eliminate personal hazard from radiation.

Before operating the described apparatus, a setting-up procedure as described in the following should be adopted.

The base plate $v$ is levelled by adjusting the feet $w$ so that the shaft A is hanging truly vertical and there is minimum precession of said shaft when the electric motor $q$ is switched on and the shaft U is rotated. The balancing weight $k$ may also be adjusted to assist in centering the shaft A if necessary.

The suspended system comprised by the balance beam, saddle assemblies, shaft A with the disc V and the counterweight I, etc., is brought into balance while the contact stud is disengaged from the balance beam and while the disc is rotating. This is achieved by altering the value of the counterweight I or by adding weights to the scale pans L1 and L2 as required. The dynamometer is then positioned so that the contact stud cooperates with the balance beam when the latter is horizontal or nearly so. The pneumatic extraction system is then switched on.

A small weight in the order of 5 to 10 gm. is then added to the scale pan L1 so as to produce a small downward out-of-balance force acting on the balance beam through the saddle D and a corresponding but magnified upward force on the contact stud Q. This small weight is retained in the scale pan L1 during the subsequent adjustment and operation of the apparatus.

The dynamometer amplifier zero shift control is then adjusted so that the appropriate indicating and/or recording instrument has a reading at mid-scale. This reading, which corresponds to there being no sample material on the disc, may be designated the reference point reading.

Weights are then added to the scale pan L1 to a value $p$ gms. corresponding to the mass of sample material which it is desired to carry upon the disc during operation of the apparatus. This weight is determined from theoretical considerations relating to the radiometric interaction concerned and from a knowledge of the area of the annular groove occupied by the sample material during operation. Said area is defined by the relative positions of the louvred tray $l$ and the suction nozzle $b$ and may be measured geometrically. With the known weight $p$ gms. still in the scale pan L1, the dynamometer amplifier gain is adjusted to give the desired scaling on the indicating and/or recording instrument. Having secured the desired scaling, the weight of $p$ gms. is removed and a check obtained to see that the indicating instrument reading returns to the reference point. Mechanical means for altering the scaling are also available as described above.

Having adjusted the dynamometer amplifier and indicating system to the desired reference point and scaling factor, it is then necessary to set the feeder control system. To this end the feeder hopper is charged with a sample of dry powdered material and the weight $p$ gms. added to the scale pan L2 corresponding to the weight of sample material which it is desired to carry upon the disc during operation of the apparatus. The feeding system is switched on and the control adjusted until the rate of feed is such as to maintain the reading of the dynamometer indicating instrument substantially constant at the reference point. The control means used for this purpose are in general conventional, consisting of a "set point" adjustment and means for adjusting the sensitivity or "gain" of the response system. As indicated above, however, it is preferred to adjust the proportional and integral control circuits of said response system independently.

When the feeder control system has been correctly adjusted, the rate of feed of dry powder on to the rotating disc V is automatically controlled so as to maintain the mass of powder carried on the disc at any one time equal to $p$ gms. within very close limits. Since the disc is rotating at a substantially constant rate, and since all the said powder is removed from the disc as it passes under the suction nozzle $b$ after having been previously loosened by the scraper assembly $a$, it follows that the sample material carried on the disc passes any given stationary point at a constant rate measured in terms of mass per unit time.

Having achieved the desired constant mass rate feed it is then necessary to adjust the compacting assembly so that the powder is uniformly compacted to form a dense layer or ribbon having a smooth top surface covering the whole width of the annular groove. This is achieved by carefully adjusting the clearance of the compacting shoe from the bottom of the annular groove.

Having adjusted the sample presentation system, it is then necessary to select the source or sources of radiation and the radiation detector or detectors appropriate to the radiometric interaction or interactions which it is desired to measure and to locate them in the desired positions with respect to the horizontal disc V and the aforementioned annular groove in particular. This is achieved by attaching said equipment to a member of the rigid support frame G as aforesaid.

Having located the appropriate sources of radiation and detectors in connection with appropriate measuring and display equipment, it will in general be necessary to adjust the controls of said equipment and to obtain a reference or calibration reading on the display equipment under conditions where there is no sample material on the disc V of the apparatus, and/or when a substance of known characteristics is present in known mass per unit area and thickness. The latter may be easily achieved using samples of material which have previously been subjected to conventional chemical analysis.

The described apparatus is then ready to be operated as follows:

With the disc rotating and pneumatic extractor switched on, a sample of the powdered material to be tested in order of 2 to 7 pounds by weight is introduced into the hopper of the feeder and the latter is switched on. Material will then be fed on to the rotating disc, compacted to form a uniform ribbon or layer and subsequently removed by the extraction system, the mass of said sample material carried upon the disc at any one time being automatically controlled at or very close to the weight $p$ gms. previously disposed in the scale pan L2 as described.

It is then possible to obtain an immediate indication and/or record of the desired radiometric parameter or parameters on the aforesaid display equipment.

By maintaining the supply of sample material to the feeder, continuous operation can be achieved for an indefinite period.

Accurate quantitative information relating to the sample composition may be derived from the displayed parameters or indices either by calculation from first principles using the known natural laws relating to radiometric interactions, or more commonly by comparing the values of said parameters or indices with those obtained under similar conditions with samples of known composition, as indicated in the foregoing.

When the apparatus as described is used to test continuously sample material arising during a manufacturing process, the displayed parameter or parameters can be used directly or indirectly to control such process. The absence of time lag in the operation of the equipment renders such control particularly effective.

Such immediate control is especially valuable in connection with industrial processes wherein very large quantities of materials are handled in a given time. Examples of such processes are to be had in the manufacture of cement, the sintering of iron stone and the extraction of nonferrous metals such as copper and zinc from their ores.

What I claim is:

1. A method of testing powdered sample material by radiometric analysis including the steps of feeding said powdered material continuously on to a moving sample carrier, continuously weighing said material on the carrier, controlling the feed rate as a function of said weight to form on the carrier a layer or ribbon having a known and substantially constant mass per unit area and substantially constant depth, applying to said layer or ribbon a known incident radiation under precisely defined geometric conditions and detecting and measuring the resultant radiations.

2. Apparatus for testing powdered sample material by radiometric analysis including a movable sample carrier, means for feeding said powdered sample material to said carrier, means for forming a layer or ribbon of powdered sample material on said carrier of substantially constant mass per unit area and substantially constant thickness and width, means for continuously measuring the weight of said powdered sample material on said carrier, means for regulating the rate of feed of said powdered sample material to said carrier in order to maintain the weight of said powdered material on said carrier substantially constant, a source of radiation past which said sample layer can be moved by the carrier at a substantially constant distance from said source so as to be irradiated thereby and means for measuring the resultant radiations emanating from the sample material.

3. Apparatus as claimed in claim 2, wherein the layer or ribbon forming means includes a feeder device adapted continuously to feed the sample material on to the carrier at a first predetermined position and at a controlled rate, means responsive to the weight of said powdered material on said carrier for controlling the rate of feeding of said feeder device to maintain the weight of said powdered material on said carrier substantially constant, a guide channel on the carrier for receiving and confining, within a constant area, said material supplied by the feeder device and a compactor for compacting the confined material to a substantially constant depth.

4. Apparatus as claimed in claim 3, including further means provided at a second predetermined position for continuously withdrawing the compacted material from the carrier after said material has been irradiated and the emanating radiations have been measured.

5. Apparatus as claimed in claim 4. including a plough assembly arranged to loosen compacted material after the latter has passed the measuring position to facilitate said withdrawal.

6. Apparatus as claimed in claim 3, including a fulcrummed balance beam for supporting the sample carrier and a dynamometer responsive to the position of the beam to provide an indication of the mass of sample material on the carrier.

7. Apparatus as claimed in claim 6, including a contact unit interposed between the beam and the dynamometer and which is designed to suppress high frequency vibrations, sensing element of the dynamometer being provided with a restricted range of movement such that the beam can be maintained substantially stationary about its fulcrum during operation.

8. Apparatus as claimed in claim 7, wherein the contact unit incorporates two rigid plates and a flexible pad separating the plates.

9. Apparatus as claimed in claim 6, including a double knife-edge assembly which constitutes the fulcrum of the balance beam and which defines a horizontal axis for said beam, said assembly being provided with adjustable lateral locating pins which are coaxial with said horizontal axis and are positioned to exert lateral restraint upon the beam to prevent the latter yawing about a vertical axis.

10. Apparatus as claimed in claim 6, including a knife edge on the beam, a weight suspended from the knife edge to counterbalance the sample carrier, and a container of oil in which the counterbalance weight is immersed, the clearance between the weight and container sides being such that all piston effect is eliminated.

11. Apparatus as claimed in claim 3 wherein the sample carrier comprises a vertical shaft, a knife edge and gimbal mounting suspending the upper end of the shaft from the beam and a carrier disc carried on the lower end of said shaft.

12. Apparatus as claimed in claim 11, including a drive shaft for said vertical shaft, a universal coupling connecting said drive shaft with said vertical shaft to permit the disc shaft free vertical and precessional movement within defined limits, and means for rotating said drive shaft.

13. Apparatus as claimed in claim 12, including means permitting the drive shaft a limited axial float, a spring resisting said axial float and means for transmitting intermittent jolts to said drive shaft against the influence of the spring in order to reduce friction generated by the drive in the universal coupling.

14. Apparatus as claimed in claim 13, including a perpendicular drive plate keyed concentrically on said drive shaft and provided with an upper rubber contact surface, and a bevelled drive wheel in driving engagement with said surface, said contact surface incorporating cam means which cooperate with the bevelled wheel to produce the aforesaid jolting movements.

15. An apparatus as claimed in claim 2, wherein the source of radiation consists of a preparation of selected radioactive material which emits radiation of known characteristics.

16. Apparatus as claimed in claim 11 wherein said guide channel is in the form of an annular groove provided around the upper face of said carrier disc.

17. Apparatus as claimed in claim 16 wherein the bottom of said guide channel is in the form of a thin window made of rigid material having a low absorption coefficient for the radiations intended to pass therethrough.

References Cited

UNITED STATES PATENTS 2,914,676 11/1959 Dijkastra et al.
3,025,400 3/1962 Schultz.

ARCHIE R. BORCHELT, *Primary Examiner.*

U.S. Cl. X.R.

250—51.5, 83.3